United States Patent
Ekkizogloy et al.

(10) Patent No.: US 7,610,494 B2
(45) Date of Patent: Oct. 27, 2009

(54) ENCRYPTED MICROCODE UPDATE OF AN OPTICAL TRANSCEIVER

(75) Inventors: Luke M. Ekkizogloy, San Jose, CA (US); Jayne C. Hahin, Cupertino, CA (US); Gerald L. Dybsetter, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 833 days.

(21) Appl. No.: 11/320,033

(22) Filed: Dec. 28, 2005

(65) Prior Publication Data

US 2007/0168679 A1 Jul. 19, 2007

Related U.S. Application Data

(60) Provisional application No. 60/640,623, filed on Dec. 30, 2004.

(51) Int. Cl.
*H04L 9/00* (2006.01)
*H04L 29/00* (2006.01)
*H04B 10/00* (2006.01)

(52) U.S. Cl. .................. 713/189; 398/135; 398/140

(58) Field of Classification Search .............. None
See application file for complete search history.

(56) References Cited

U.S. PATENT DOCUMENTS

| 6,480,959 | B1 * | 11/2002 | Granger et al. | 713/189 |
| 6,704,872 | B1 * | 3/2004 | Okada | 713/194 |
| 7,295,750 | B2 * | 11/2007 | Ekkizogloy et al. | 385/147 |
| 7,305,567 | B1 * | 12/2007 | Hussain et al. | 713/189 |
| 7,392,400 | B2 * | 6/2008 | Henry et al. | 713/190 |
| 2004/0022537 | A1 | 2/2004 | Mecherle et al. | 398/41 |
| 2006/0002710 | A1 * | 1/2006 | Dybsetter et al. | 398/135 |
| 2006/0093370 | A1 * | 5/2006 | Ekkizogloy et al. | 398/135 |
| 2006/0093371 | A1 * | 5/2006 | Hahin et al. | 398/135 |
| 2007/0092258 | A1 * | 4/2007 | Nelson | 398/135 |
| 2009/0138709 | A1 * | 5/2009 | Ekkizogloy et al. | 713/168 |

* cited by examiner

*Primary Examiner*—Christopher A Revak
(74) *Attorney, Agent, or Firm*—Workman Nydegger

(57) ABSTRACT

An optical transceiver (or optical transmitter or optical receiver) that has at least one processor and a memory. The optical transceiver receives encrypted microcode from a source. The optical transceiver may then decrypt the received microcode to create decrypted microcode. The decrypted microcode is then written to the memory, where it may be executed by the at least one processor. The microcode, when executed by the at least one processor, controls one or more functions of the optical transceiver.

20 Claims, 2 Drawing Sheets

ENCRYPTED MICROCODE UPDATE OF AN OPTICAL TRANSCEIVER

CROSS-REFERENCE TO RELATED APPLICATIONS

This application claims the benefit of U.S. Provisional Application No. 60/640,623, filed Dec. 30, 2004, which is incorporated herein by reference in its entirety.

BACKGROUND

1. The Field of the Invention

The present invention relates generally to optical transmitters and receivers. More specifically, the present invention relates to optical transmitter and receivers that are capable of running different versions of microcode to manage its operation.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to the "controller") controls the operation of the laser driver and post-amplifier.

Controllers are typically implemented in hardware as state machines. Their operation is fast, but inflexible. Being primarily state machines, the functionality of the controller is limited to the hardware structure of the controller. What would be advantageous are controllers that have more flexible functionality.

BRIEF SUMMARY

The foregoing problems with the prior state of the art are overcome by the principles of the present invention. The principles of the present invention relate to an optical transceiver (or optical transmitter or optical receiver) that has at least one processor and a memory.

The optical transceiver receives encrypted microcode from a source. The optical transceiver may then decrypt the received microcode to create decrypted microcode. The decrypted microcode is then written to the memory, where it may be executed by the at least one processor. The microcode, when executed by the at least one processor, controls one or more functions of the optical transceiver.

Accordingly, the principles of the present invention help to prevent the unauthorized execution of the encrypted microcode. The invention also helps to protect the transceiver by acting as a safeguard against the loading of improper microcode into the transceiver that may cause damage the operation of the transceiver or to components of the transceiver.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to a method for an optical transceiver to decrypt encrypted microcode. The optical transceiver includes a memory and a processor. The transceiver receives encrypted microcode. The microcode, when executed, controls the behavior of the optical transceiver. The transceiver then causes the encrypted microcode to be decrypted. The decrypted microcode is written to the memory where it may later be executed by the processor to thereby control the optical transceiver. This allows the behavior of the optical transceiver to be altered in a secure manner. An example operational optical transceiver environment will first be described. Then, the operation in accordance with the invention will be described with respect to the operational environment.

Figure 1:
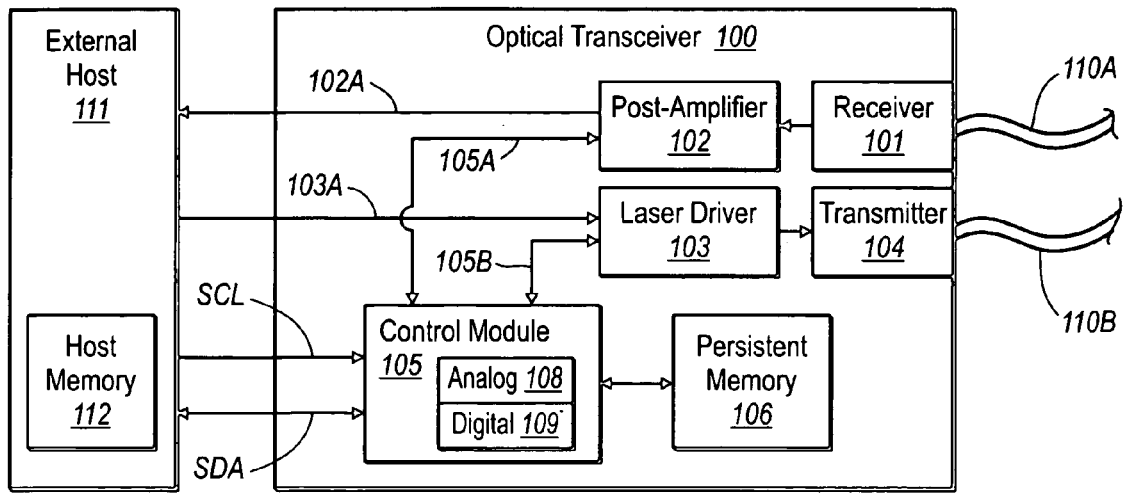
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EE-PROM). The persistent memory 106 and the control module 105 may be packaged together in the same package or in different packages without restriction. Persistent memory 106 may also be any other non-volatile memory source.

Figure 2:
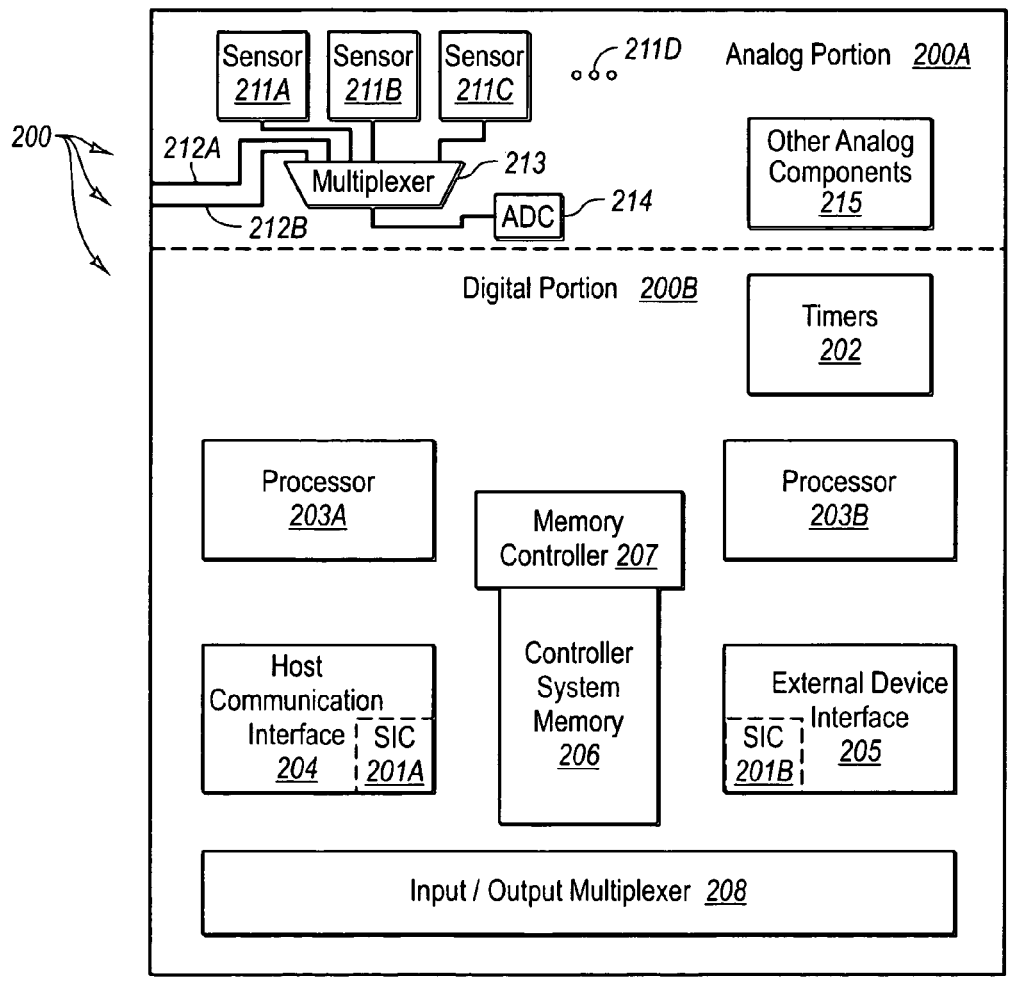
FIG. 2 schematically illustrates an example of the control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver capable of receiving and decrypting encrypted microcode. The principles of the present invention will be discussed with reference to the environment described in relation to FIGS. 1 and 2.

In one embodiment of the present invention, host 111 may be connected to a remote data site over a wide area network such as the internet by any standard internet or wide area network protocol. The remote data site may be a network server or similar device. The remote data site may be configured to contain a library of microcode sets that may each, when executed, control transceiver 100 operation in different ways. In the description and in the claims "microcode" is defined to include, but is not limited to, firmware, software, or any other type of executable instructions that may control the operation of the optical transceiver.

The remote data site may allow a user to identify and select various desired microcode sets through use of an interface such as a World Wide Web site. For example, the World Wide Web site may include a Web page that contains radio buttons that correspond to the microcode sets. A user may identify a desired microcode set by selecting the radio button for that feature using a keyboard or a mouse connected to host 111.

In response, the remote data site may access the microcode sets corresponding to the microcode set(s) identified by the selected radio button(s). The microcode set(s) may be encrypted by the remote data site to prevent execution by unauthorized transceivers. The remote data site may then send the microcode sets to host 111.

In another embodiment, microcode may be obtained from a source other the remote computing site. For example, the microcode sets may be delivered to the user on a portable storage unit such as a digital video disk (DVD) or a compact disk (CD) ROM provided by the transceiver 100 manufacturer. The microcode stored on the DVD or CD ROM may be loaded into host 111. This microcode may also be encrypted to prevent execution by unauthorized transceivers.

The encrypted microcode, either from the portable storage unit or the remote data site, may then be provided to transceiver 100 by host 111 over the implemented host communication interface. The encrypted microcode may be loaded into controller system memory 206 or persistent memory 106.

In order for transceiver 100 to execute the encrypted microcode, a decryption key may be needed. The decryption key may be structured to allow the transceiver 100 to access and execute the encrypted microcode. The decryption key may comprise one or more instructions or algorithms that are configured to perform the decryption operation. To ensure that only authorized optical transceivers may decrypt the encrypted microcode, the decryption key may also include a unique transceiver identifier such as a serial number that must be included in the encrypted microcode for the decryption to occur.

In one embodiment, the decryption key may be pre-loaded into persistent memory 106. Processors 203 may load the decryption key into controller system memory 206. On execution, the decryption key may decrypt the encrypted microcode and allow for further execution.

In another embodiment, the decryption key may be part of the host communication interface 204 and is activated when the optical transceiver goes through a boot process. This embodiment is advantageous as the encrypted microcode is received over the host communication interface.

In still other embodiments, a user may access the remote data site in the manner described previously. However, instead of only containing a library of microcode sets, the remote data site may also contain a library of decryption keys. A user would select the radio buttons corresponding to decryption keys for the microcode that the user desired to implement in transceiver 100.

The decryption keys may then be sent to host 111. Processors 203 may load the decryption keys from host memory 112 into controller system memory 206. The decryption key may then be used to decrypt the microcode to allow the microcode to be executed at some point.

Once the encrypted microcode has been decrypted, processors 203 may load the decrypted microcode into portions of controller system memory 206 for immediate execution. Alternatively, the decrypted microcode may be written to persistent memory 106 for later execution, or any other memory location directly, or indirectly, accessible by the processor(s) that execute the microcode.

As mentioned previously, the decrypted microcode, when executed, controls at least one function of transceiver 100. For example, the executed microcode may direct the operation of transceiver 100 to modify such operational parameters as operating temperature and voltage. Other executed microcode may identify and set the protocol and speed of transceiver 100. Still other types of executed microcode may allow a user to implement specific user desired features such as temperature warning alarms or off transceiver logging of information.

Figure 3:
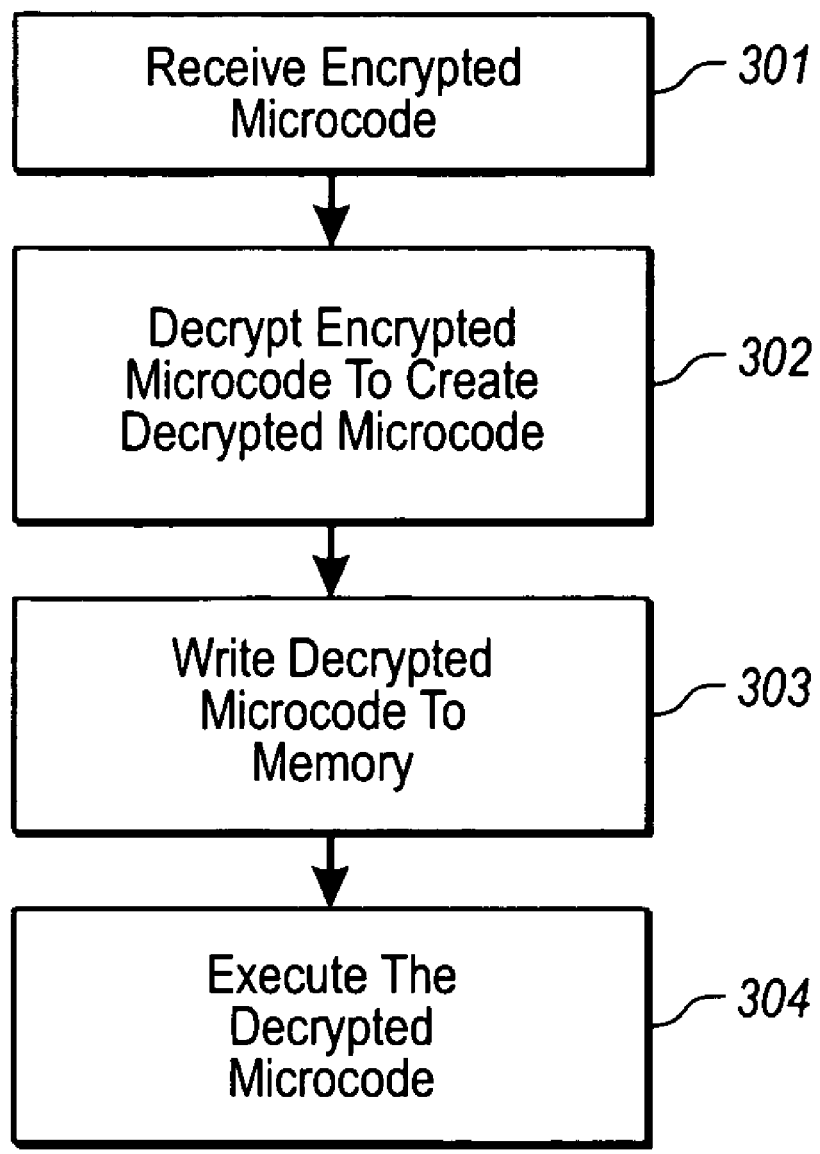
FIG. 3 illustrates a flowchart of a method for the optical transceiver of FIG. 1 to decrypt encrypted microcode in accordance with the principles of the present invention.

Referring now to FIG. 3, a flowchart of a method 300 for an optical transceiver of FIG. 1 to decrypt encrypted microcode in accordance with the principles of the present invention is illustrated. Method 300 will be discussed with frequent reference to the specific optical transceiver environment described in relation to FIGS. 1 and 2. Note, however, that the specific optical transceiver environment of FIGS. 1 and 2 is only one of numerous environments that may perform method 300 and so should not be used to limit the claims.

Method 300 includes an act of an optical transceiver receiving encrypted microcode (act 301). For example, optical transceiver 100 may receive encrypted microcode. The encrypted microcode may be received over the Internet from a remote data site. Alternatively, the encrypted microcode may be received from a portable storage unit such as a DVD.

Method 300 also includes an act of decrypting the received encrypted microcode to create decrypted microcode (act 302). For example, transceiver 100 may include a decryption key. The decryption key may include instructions or algorithms for decrypting the microcode. In some embodiments, the decryption key may include a specific identifier such as a transceiver serial number that is used to prevent an unauthorized transceiver from decrypting the encrypted microcode.

Method 300 further includes the act of writing the decrypted microcode to a memory (act 303) and the act of executing the decrypted microcode (act 304). For example, processors 203 may write the decrypted microcode to controller system memory 206 for immediate execution. Alternatively, the decrypted microcode may be written to persistent memory 106 for later execution. As mentioned, the decrypted microcode, when executed, may control at least one function of transceiver 100.

Accordingly, the principles of the present invention relate to a method for an optical transceiver to receive and decrypt encrypted microcode. This method prevents the unauthorized execution of the microcode. It also helps to protect the transceiver by acting as a safeguard against the loading of improper microcode into the transceiver. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical transceiver that includes a memory and at least one processor, a method for the optical transceiver to receive and decrypt encrypted microcode, the method comprising the following:
   an act of receiving encrypted microcode;
   an act of decrypting the received encrypted microcode to create decrypted microcode comprising instructions that, when executed by the at least one processor, control at least one function of the optical transceiver;
   an act of writing the decrypted microcode to the memory of the optical transceiver; and
   an act of the at least one processor executing the decrypted microcode written to the memory.

2. A method recited in claim 1, further comprising an act of employing a decryption key that is structured to allow the optical transceiver to access and execute the encrypted microcode.

3. A method recited in claim 2, wherein the decryption key includes a unique transceiver identifier for allowing the act of decrypting the received encrypted microcode to occur.

4. A method recited in claim 3, wherein the unique transceiver identifier is a transceiver serial number.

5. A method recited in claim 2, further comprising the step of pre-loading the decryption key into memory.

6. A method recited in claim 1, wherein the memory included in the optical transceiver is one of a system memory or a persistent memory.

7. An optical transceiver, comprising:
   at least one processor;
   a persistent memory having thereon microcode comprising instructions that, when executed by the at least one processor, control at least one function of the optical transceiver, wherein the persistent memory is coupled to the at least one processor such that the processor may read and execute the microcode; and
   a microcode loader mechanism configured to perform the following:
      receive encrypted microcode;
      decrypt the received encrypted microcode to create decrypted microcode comprising instructions that, when executed by the at least one processor, control at least one function of the optical transceiver;
      write the decrypted microcode to the persistent memory of the optical transceiver; and
      execute the decrypted microcode written to the persistent memory.

8. An optical transceiver as recited in claim 7, wherein the optical transceiver is communicatively coupled to an external host that provides the encrypted microcode to the optical transceiver.

9. An optical transceiver as recited in claim 8, wherein the external host is connected to a wide area network.

10. An optical transceiver as recited in claim 8, wherein the external host is connected to a remote data site.

11. An optical transceiver as recited in claim 10, wherein the remote data site contains a library of microcode sets structured such that, when executed by the at least one processor of the optical transceiver, the library of microcode controls behavior of the optical transceiver.

12. An optical transceiver as recited in claim 8, wherein the external host is connected to a World Wide Web site including a webpage that contains radio buttons that correspond to microcode sets.

13. An optical transceiver as recited in claim 8, wherein the external host is configured to read a portable storage unit having microcode sets stored thereon.

14. An optical transceiver as recited in claim 7, wherein a decryption key is pre-loaded into persistent memory, wherein the decryption key is structured to allow the optical transceiver to access and execute the encrypted microcode.

15. An optical transceiver as recited in claim 10, wherein the remote data site includes a library of decryption keys that are accessible by the optical transceiver, wherein the decryption key is structured to allow the optical transceiver to access and execute the encrypted microcode.

16. An optical transceiver as recited in claim 7, further comprising a system memory for storing the encrypted microcode upon its reception.

17. An optical transceiver as recited in claim 16, wherein a decryption key is pre-loaded into the system memory, wherein the decryption key is structured to allow the optical transceiver to access and execute the encrypted microcode.

18. An optical receiver, comprising:
   at least one processor;
   a persistent memory having thereon microcode comprising instructions that, when executed by the at least one processor, control at least one function of the optical receiver, wherein the persistent memory is coupled to the at least one processor such that the processor may read and execute the microcode; and a microcode loader mechanism configured to perform the following:

receive encrypted microcode;

decrypt the received encrypted microcode to create decrypted microcode comprising instructions that, when executed by the at least one processor, control at least one function of the optical transmitter;

write the decrypted microcode to the persistent memory of the optical receiver; and execute the decrypted microcode written to the persistent memory.

19. An optical receiver as recited in claim 18, wherein a decryption key is pre-loaded into persistent memory, wherein the decryption key is structured to allow the optical transceiver to access and execute the encrypted microcode.

20. An optical receiver as recited in claim 18, wherein the optical receiver is a portion of an optical transceiver.

* * * * *

UNITED STATES PATENT AND TRADEMARK OFFICE
CERTIFICATE OF CORRECTION

PATENT NO. : 7,610,494 B2  Page 1 of 1
APPLICATION NO. : 11/320033
DATED : October 27, 2009
INVENTOR(S) : Luke M. Ekkizogloy et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 833 days.

should read (*) Notice: Subject to any disclaimer, the term of this patent is extended or adjusted under 35 U.S.C. 154(b) by 970 days.

Column 2
Line 14, change "damage the" to --damage to the--

Column 6
Line 4, change "other the" to --other than the--

Signed and Sealed this

Third Day of August, 2010

David J. Kappos
*Director of the United States Patent and Trademark Office*